(12) United States Patent
Ganz et al.

(10) Patent No.: US 10,796,690 B2
(45) Date of Patent: Oct. 6, 2020

(54) DIGITAL MEDIA ENVIRONMENT FOR CONVERSATIONAL IMAGE EDITING AND ENHANCEMENT

(71) Applicant: Adobe Inc., San Jose, CA (US)

(72) Inventors: Frieder Ludwig Anton Ganz, Hamburg (DE); Walter Wei-Tuh Chang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 160 days.

(21) Appl. No.: 16/109,464

(22) Filed: Aug. 22, 2018

(65) Prior Publication Data
US 2020/0066261 A1    Feb. 27, 2020

(51) Int. Cl.
| | | |
|---|---|---|
| *G10L 15/00* | (2013.01) |
| *G10L 15/18* | (2013.01) |
| *G10L 15/22* | (2006.01) |
| *G06T 7/00* | (2017.01) |
| *G06F 3/16* | (2006.01) |
| *G06F 3/0481* | (2013.01) |

(52) U.S. Cl.
CPC ........ *G10L 15/1815* (2013.01); *G06F 3/0481* (2013.01); *G06F 3/167* (2013.01); *G06T 7/0002* (2013.01); *G10L 15/22* (2013.01); *G06T 2207/10004* (2013.01); *G06T 2207/30168* (2013.01); *G10L 2015/223* (2013.01)

(58) Field of Classification Search
CPC ..... G10L 15/22; G10L 15/2265; G06F 3/167; H04M 2201/40
USPC ........................................................ 704/275
See application file for complete search history.

(56) References Cited

U.S. PATENT DOCUMENTS

| | | | | |
|---|---|---|---|---|
| 6,816,847 B1 * | 11/2004 | Toyama | ................... | G06K 9/00 382/156 |
| 2013/0235071 A1 * | 9/2013 | Ubillos | ................. | G06F 3/0484 345/600 |

OTHER PUBLICATIONS

Manuvinakurike et al. "Conversational Image Editing: Incremental Intent Identification in a New Dialogue Task". Proceedings of the SIGDIAL 2018 Conference, pp. 284-295. Melbourne, Australia, Jul. 12-14, 2018. (Year: 2018).*

(Continued)

*Primary Examiner* — Jesse S Pullias
(74) *Attorney, Agent, or Firm* — SBMC

(57) ABSTRACT

Conversational image editing and enhancement techniques are described. For example, an indication of a digital image is received from a user. Aesthetic attribute scores for multiple aesthetic attributes of the image are generated. A computing device then conducts a natural language conversation with the user to edit the digital image. The computing device receives inputs from the user to refine the digital image as the natural language conversation progresses. The computing device generates natural language suggestions to edit the digital image based on the aesthetic attribute scores as part of the natural language conversation. The computing device provides feedback to the user that includes edits to the digital image based on the series of inputs. The computing device also includes as feedback natural language outputs indicating options for additional edits to the digital image based on the series of inputs and the previous edits to the digital image.

20 Claims, 11 Drawing Sheets

(56) References Cited

OTHER PUBLICATIONS

Datta,"Studying Aesthetics in Photographic Images Using a Computational Approach", Proceedings of the European Conference on Computer Vision, 2006, 14 pages.
Kong,"Photo Aesthetics Ranking Network with Attributes and Content Adaptation", Sep. 2016, 16 pages.

* cited by examiner

DIGITAL MEDIA ENVIRONMENT FOR CONVERSATIONAL IMAGE EDITING AND ENHANCEMENT

BACKGROUND

Users continue to generate a multitude of digital images from a variety of devices, such as smartphones. However, despite the recent advances in smart phone cameras, there is still a need to edit these images, such as to touch up or enhance captured digital images. Conventional interfaces for digital image editing, however, are often complex with dozens of selectable editing options and an expectation that the user acquires detailed knowledge to learn the language and basic concepts of image processing supported by these interfaces. Accordingly, users of conventional interface face a steep learning curve.

Conventional interfaces for digital image editing, for example, often include a number of pictorial symbols for image editing operations, which can be difficult for users to decipher the image editing operation associated with the symbol. If a user then "tests out" one of these pictorial symbols, unintended editing operations can be applied to the user's digital image, leading to further frustration when the user is forced to then figure out how to undo the unintended operation. Without detailed knowledge typically obtained from taking a class or receiving direct instruction about conventional interfaces, it is exceptionally frustrating for users, especially novice users, to navigate these complex digital image editing interfaces to perform even simple image editing operations. Consequently, typical users often do not have the time or patience to learn a complex digital editing interface to perform editing operations on their digital images, and thus are left with digital images having undesirable characteristics that could be remedied using these interface had the user obtained this knowledge.

SUMMARY

Techniques for conversational image editing and enhancement in a digital media environment are described. These techniques overcome the limitations of conventional systems that require users to learn difficult digital image editing user interfaces to perform many digital image editing tasks. The interfaces described herein support techniques to summarize and present information to perform digital image editing using a conversational user interface. The interfaces described herein are configured to guide a user through use of editing operations that may be applied to a natural language conversation.

In one example, a computing device receives a digital image, such as through a messaging interface or chatbot. The computing device then implements a natural language conversation with the user to edit the digital image. In one example, the computing device receives a series of inputs from the user. The system may then perform image editing operations as well as suggest other image editing operations as part of the natural language conversation. In this way, the user may provide the series of inputs using utterances that are natural to the user, without having to know specific terms for the editing actions or attributes to perform the edits. The computing device, as part of the conversation, provides feedback to the user that includes edits to the digital image based on the series of inputs, which may also include a set of edited variations to the digital image from which the user may select a preferred edit.

In another example, the computing device generates a natural language suggestion to edit the digital image based on the aesthetic attribute scores as part of the natural language conversation. The aesthetic attribute scores correspond to aesthetic attributes of the digital image, such as color harmony, content, depth of field, and so forth. The natural language suggestion gives the user a set of options to guide editing of the digital image that are easy to understand, and that will improve the quality of the digital image. The natural language suggestion may be output in a user interface, e.g., a text output by a chatbot, or may be output by a speaker of the computing device, to name a few examples. As a result, efficiency of user interaction with the user interface is improved. In response to receiving a natural language input from the user to edit the digital image in accordance with the suggestion, the computing device executes the edit to the digital image. By performing the suggested edit, the attribute scores are consequently improved, as well as the quality of the digital image.

The computing device then generates an additional natural language suggestion based on a different one of the aesthetic attribute scores as the conversation continues. The additional natural language suggestion indicates options for additional edits to the digital image based on the natural language input from the user and the executed edit to the digital image. For example, the additional natural language suggestion may relate to a different attribute of the digital image that can be improved, and thus the overall quality of the digital image is also improved. The natural language conversation techniques described herein provide users with efficient digital image editing and enhancement options while using natural language commands in applications that users are already familiar with, and without having to learn a complex digital imaging user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
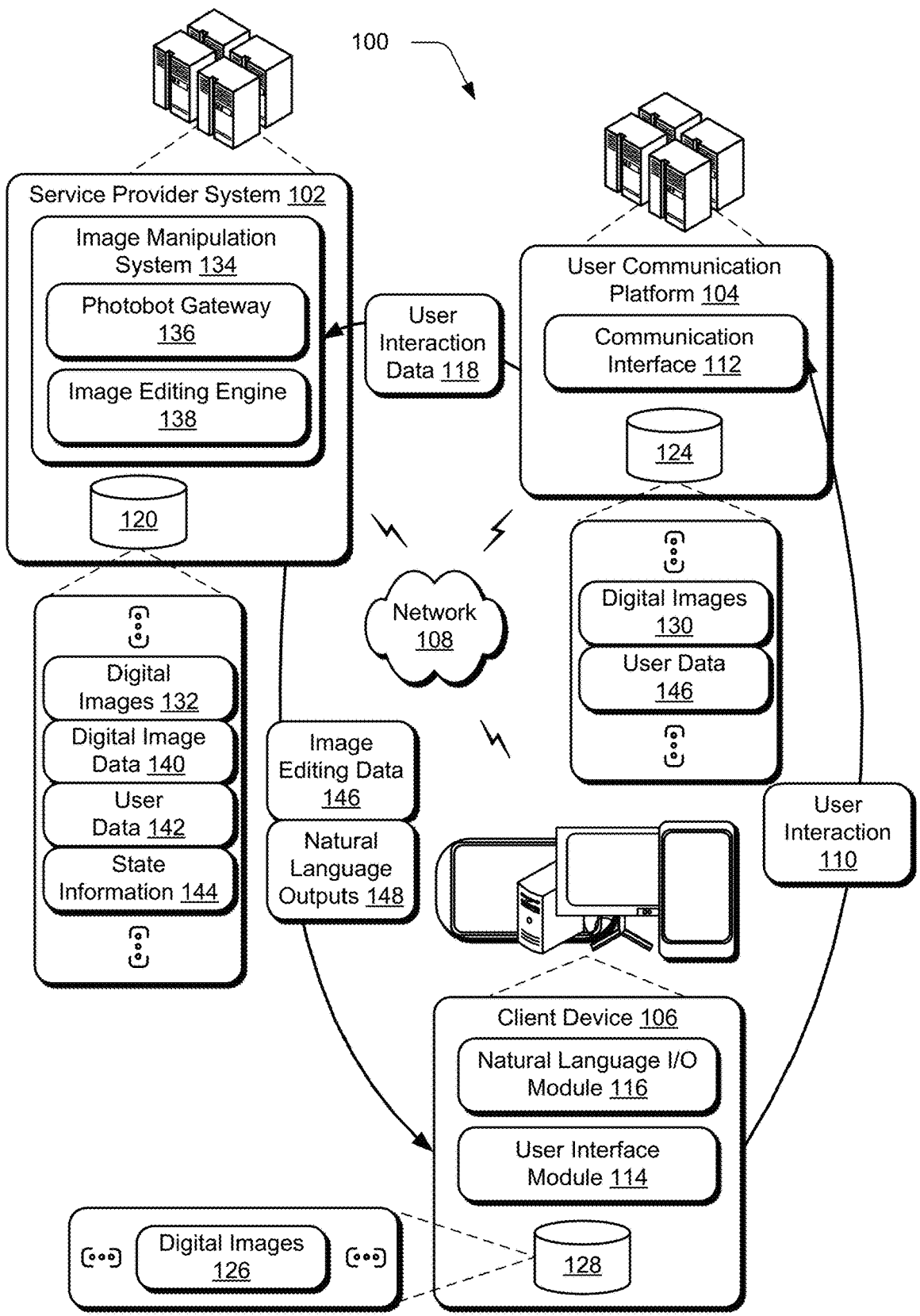
FIG. 1 is an illustration of an environment in an example implementation that is operable to employ conversational image editing techniques described herein.

Users continue to generate increasing numbers of digital images with various types of devices, such as digital cameras and smart phones. In spite of advances to the hardware and software of these devices to capture higher quality content, users often still have a need to edit the digital images, such as to touch-up or enhance the digital images. Furthermore, many users desire to create new digital images by editing stock images, for instance. However, making these edits to digital images often requires a steep learning curve with complex image editing interfaces that require users to learn the language and concepts of image processing. In conventional systems, users are forced to understand and describe complicated image properties such as contrast, hue, saturation, levels, and cropping, and learn how the image properties are changed and combined within a particular digital image editing application to achieve a desired effect.

Furthermore, effective image edits are often localized to a specific region of a digital image, e.g., to brighten a face, recolor an eye, make a sky more blue, or make a sunset more vivid. Localizing image edits to a specific region of a digital image often requires sophisticated direct manipulation of the digital image, conventionally made on large displays using software applications that are only effectively accessible using desktop computers. Although simple image editing tasks can be performed recently on small, portable devices such as mobile phones and tablets, the sophisticated editing interactions on these smaller devices remains challenging by form factors of the devices and consequently are typically avoided by many users.

Considering the difficulty of image editing and enhancement tasks in conventional systems, users seek simpler and more efficient techniques to accomplish image modification goals. Accordingly, techniques are described in which conversational image editing enables users to modify digital images without the sophisticated knowledge base required by conventional systems. Conversational image editing leverages natural language processing technologies to make complex image editing tasks more accessible to users. Natural language processing interfaces make these complex tasks easier by allowing users to simply state their desired output (e.g., by voice or text instruction) without having to access and manipulate sophisticated digital image editing applications. The techniques described herein further overcome the limitations of conventional systems by being able to interpret a variety of natural language inputs ranging from simple instructions by a novice image editor to common shorthand used by experienced image editors. For example, the techniques described herein are able to interpret "natural" instructions, e.g., "brighten the image a bit," "even out the skin tone," "clean up the background slightly," or "darken the midtones overall."

In one example, an image manipulation system configured to implement the conversational image editing techniques described herein first receives an indication of a digital image from a user. For instance, the image manipulation system may receive the indication of the digital image as a text input via a chatbot included as part of one of the platforms described below. Alternatively or additionally, the image manipulation system may receive the indication of the digital image as a voice input via a virtual agent platform as described below. The indication of the digital image may be a file path, a URL, or a copy-and-pasted digital image, to name a few examples. The image manipulation system generates aesthetic attribute scores for aesthetic attributes of the digital image. Aesthetic attributes are characteristics of a digital image that are generally visually pleasing, and span recognized photographic principles of color, lighting, focus, and composition. Using the aesthetic attribute scores, the image manipulation system can begin formulating "conversation topics" regarding the digital image and provide guidance and suggestions on how to edit or enhance the digital image.

The image manipulation system then conducts a natural language conversation with the user to edit the digital image. For example, the natural language conversation includes a series of inputs from the user which are used to refine the digital image as the natural language conversation progresses. The image manipulation system provides feedback to the user, including edits to the digital image in accordance with the inputs received from the user. Additionally, the image manipulation system provides feedback in the form of natural language outputs indicating options for additional edits to the digital image based on the series of inputs and the edits previously made to the digital image.

A user, for instance, may initiate a natural language instruction such as "Make the sky more blue." In response, the image manipulation system uses object recognition techniques to identify the sky within the digital image and alter the color values to include additional amount of the color blue within the sky region. The image manipulation system then outputs, as feedback, the digital image with the altered color in the sky region. The image manipulation system also outputs a natural language response, such as "How does that look?" which correlates to both the user's natural language input and the edit performed on the digital image. The image manipulation system may also output an additional natural language suggestion to further edit the image utilizing the object recognition techniques, such as "Would you like to remove the red eye as well?" The additional natural language suggestion provides additional options to edit the digital image and builds upon the previous edits to the digital image and the progressing conversation with the user.

In another conversational example, the image manipulation system generates a natural language suggestion to edit the digital image based on one, or multiple, of the aesthetic attribute scores. In response to receiving a natural language input from a user to edit the digital image in accordance with the suggestion, the image manipulation system edits the digital image to alter or improve the aesthetic attribute score.

The image manipulation system then generates another natural language suggestion based on a different aesthetic attribute score indicating options for additional edits to the digital image. The second natural language suggestion is based on the received natural language input from the user, along with the previously executed edit to the digital image.

In another example, the image manipulation system determines that an attribute score for lighting within the digital image is below a threshold value, causing the image manipulation system to suggest an improvement to the lighting. The image manipulation system generates a natural language suggestion such as, "I see your photo looks a bit dark. Can I brighten it up for you?" The user responds, "Sure, go ahead." The image manipulation system then changes the lighting of the digital image to increase the aesthetic attribute score associated with lighting, such as to bring the aesthetic attribute score above the threshold value. Then, the image manipulation generates another suggestion including an option to edit the digital image, such as, "Now that your photo is brighter, how about we remove some of the blurriness?" In this way, the image manipulation system builds upon previous inputs from the user and previous edits to the digital image, thus providing a more aesthetically pleasing image in an easy-to-use, conversational manner.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for conversational image editing as described herein. The illustrated environment 100 includes a service provider system 102, a user communication platform 104, and a plurality of client devices, an example of which is illustrated as client device 106. These devices are communicatively coupled, one to another, via a network 108 and may be implemented by a computing device that may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the user communication platform 104 and as further described in FIG. 9.

The client device 106 is illustrated as engaging in user interaction 110 with a communication interface 112 of the user communication platform 104. The user interaction 110 may take a variety of forms, such as interactions with a user interface module 114 including, but not limited to, mouse inputs (e.g., click, hover, scroll), keyboard inputs (e.g., type, navigate, volume control), voice inputs (e.g., instructions, selections, inquiries), touch inputs, and so forth. The user interface module 114 may provide an interface for the user communication platform 104 to enable users to communicate via the network 108, such as with other users and/or other computing devices. The user communication platform 104 may be implemented in a variety of platforms including social networking platforms (e.g., Facebook®, Google+®, Instagram®, etc.), communication platforms (e.g., Slack®, WeeChat®, WhatsApp®, Skype®, etc.), virtual agents (e.g., Siri®, Alexa®, Google®), and so forth.

For example, the user communication platform 104 may be a social networking platform such as Facebook®, which enables users to communicate with other users and other computing devices via the network 108 by using the user interface module 114 located at the client device 106. In another example, the user communication platform 104 may be a communication platform such as Skype®, which enables users to communicate with other users via the network 108 by using the user interface module 114 located at the client device 106. In but one more example, the user communication platform 104 may be a virtual agent platform such as Siri®, which enables users to communicate with other computing devices to access information via the network 108 by using the user interface module 114 located at the client device 106.

The client device 106 is also shown as including a natural language input/output (I/O) module 116, which is configured to intake and output natural language communications between the computing device 106 and a user. In one example, the natural language I/O module 116 is a chatbot, also known as an interactive agent or artificial conversational entity. The chatbot simulates conversation with human users via auditory or textual methods, especially over the network 108. Chatbots are often designed to convincingly simulate how a human would behave as a conversational partner using sophisticated natural language processing systems, but simpler systems also exist which scan for keywords in the user's input and generate replies with the most matching keywords or the most similar wording pattern.

The natural language I/O module 116 may work together with the user interface module 114 to provide an integrated platform for natural language communication between the client device 106 and a user, such as through a chatbot, a virtual agent, talk-to-text, and so forth. Thus, the natural language I/O module 116 is configured to virtually simulate a conversational partner to a user of the client device 106 as part of a dialog system to implement a natural language conversation. The natural language I/O module 116 provides natural language inputs by a user to the communication interface 112 of the user communication platform 104 as part of the user interaction data 110. The user communication platform 104 then generates user interaction data 118 (e.g., by the communication interface 112) that describes the user interactions 110, which is communicated to the service provider system 102 and may be stored in a storage device 120.

Natural language processing as implemented by the natural language I/O module 116 is configured to incorporate speech recognition, natural language understanding, and natural language generation. This is used to understand communications received from the client device 106 as part of a natural language conversation as well as to generate communications to the client device 106. The natural language I/O module 116, for instance, may employ a neural network to generate a representation of a communication from the client device 106, and from this, understand "what is being said" as well as to generate an appropriate response, if any. This may be used for a variety of purposes.

The user communication platform 104, for instance, may be configured to support user interaction with a variety of functionality, such as digital products and services, other users, and other computing devices as described above and below. As part of these interactions, the user communication platform 104 may generate user data 122 to be stored in storage 124 of the communication platform. The user data 122 may include any information relevant to the user's interactions with the user communication platform 104; for instance, in a communication platform such as WhatsApp®, the user data may include the user's contacts and chat histories, while in a social networking platform such as Facebook®, the user data may include friends of the user and topics that the user is interested in.

The client device 106, user communication platform 104, and the service provider system 102 may work together to provide a system for conversational image editing. To do so, a user of the client device 106 may designate a digital image in the user interface module 114 that the user would like to edit. The digital image may be one of digital images 126 stored in storage 128 of the client device 106, may be one of digital images 130 accessed from the storage 124 of the user communication platform, and/or may be one of digital images 132 stored in storage 120 of the service provider system 102. For example, if the user communication platform 104 is a social networking site such as Facebook®, the designation of the digital image may be a selection of one of the user's digital images 130 stored remotely in the storage 124. In another example, the user may designate a digital image from the digital images 132 stored in storage 120 of the service provider system 102 as part of a digital image subscription service, such as Adobe® Stock.

The user communication platform 104 and the service provider system 102 then collaboratively provide conversational interactions with the user of the client device 106 to edit the digital image designated by the user. To do so, the natural language I/O module 116 interprets natural language commands and questions from the user (e.g., the user interaction 110), and maps the natural language commands and questions to canonical intentions related to the digital image. A canonical intention refers to a generic objective which may be accomplished by a variety of different instructions, such as a particular image editing operation. The communication interface 112 of the user communication platform 104 relays the user interaction 110 to an image manipulation system 134 of the service provider system 102. The image manipulation system 134 includes a photobot gateway 136, which is configured to map the canonical intentions to application programming interface (API) commands of an image editing engine 138 of the image manipulation system 134. The image editing engine 138 executes the API commands to perform image editing tasks on the designated digital image. The image manipulation system 134 therefore leverages the user communication platform 104 to participate as part of a natural language conversation by generating communications as part of a "back-and-forth" with a user of the client device 106.

To execute the API commands, the image editing engine 138 may utilize a variety of different information, such as digital image data 140, user data 142, and/or state information 144. The digital image data 140 may be metadata associated with digital images, such as internal metadata embedded in the image file (e.g., JPEG or TIFF) and/or external metadata maintained in the storage 120 or in a "sidecar" file (e.g., XMP, external XML-based news exchange format file). The digital image data 140 may include, for example, administrative information (e.g., identification of the creator, creation date, and location, contact information for licensors of the image, and so forth), descriptive information (e.g., headline, title, captions, keywords, other information about the visual content), and/or rights information (copyright information and underlying rights in the visual content including model and property rights and rights usage terms).

The user data 142 includes characteristics and qualities of the user with which the image manipulation system 134 is communicating, and which may be relevant to a conversation between the user and the image manipulation system regarding the digital image being edited. The user data 142 may be received, for example, from user data 146 stored in storage 124 of the user communication platform 104 as appropriate. The user data 142 may include a name of the user, age, gender, location, education, language, employer, hobbies, subscription information, frequency of use, experience with the system, and so forth. In some scenarios, the image manipulation system 134 may generate and store relevant user data 142 as a conversation to edit a digital image progresses, such as friends of the user with whom the user often shares edited digital images with.

The state information 144 includes information as a natural language conversation progresses between a user and the image manipulation system 134 to track interactions between the user and the image manipulation system, and to maintain a conversational context. The state information 144 includes, for instance, previous edits performed on a digital image, previous edit options presented to the user, locations from which a digital image being edited was retrieved, and so forth. By maintaining the digital image data 140, the user data 142, and the state information 144, the image manipulation system can perform complex digital image editing tasks while providing an easy to use, intuitive, and personalized natural language interface to users.

As part of a natural language conversation with a user to edit a digital image, the image editing engine 138 generates image editing data 146 which is output to the client device 106 to execute determined image editing tasks. The image editing data 146 instructs the client device 106 how to edit the digital image in accordance with the instructions provided by the user, and/or suggestions provided by the image manipulation system 134. The client device 106 executes the instructions in the image editing data 146 on the digital image, and outputs the edited digital image using the user interface module 114. Alternatively or additionally, the image editing engine 138 performs the digital image edits, and provides the client device 106 with an edited digital image as part of the image editing data 146 to be output by the user interface module 114.

Along with the edits provided to the client device 106 in the image editing data 146, the photobot gateway 136 generates natural language outputs 148 as part of the natural language conversation with the user. The natural language outputs 148 may include, for example, responses to questions by the user during the conversation, suggestions of additional edits to perform on the digital image, comments on edits made during the conversation, and so forth. The natural language outputs 148 are received by the natural language I/O module 116 and output by the client device 106 as appropriate. For example, the natural language I/O module 116 may translate the natural language outputs 148 to audio outputs to be played over a speaker of the client device 106 or mapped to text to be displayed by a user interface of the user interface module 114, to name a few examples. Accordingly, the system 100 may be implemented in a variety of scenarios with a vast number of different types of client devices and user communication platforms to enable users to easily make edits to digital images, without having to learn the sophisticated image editing interfaces of conventional systems.

Figure 2:
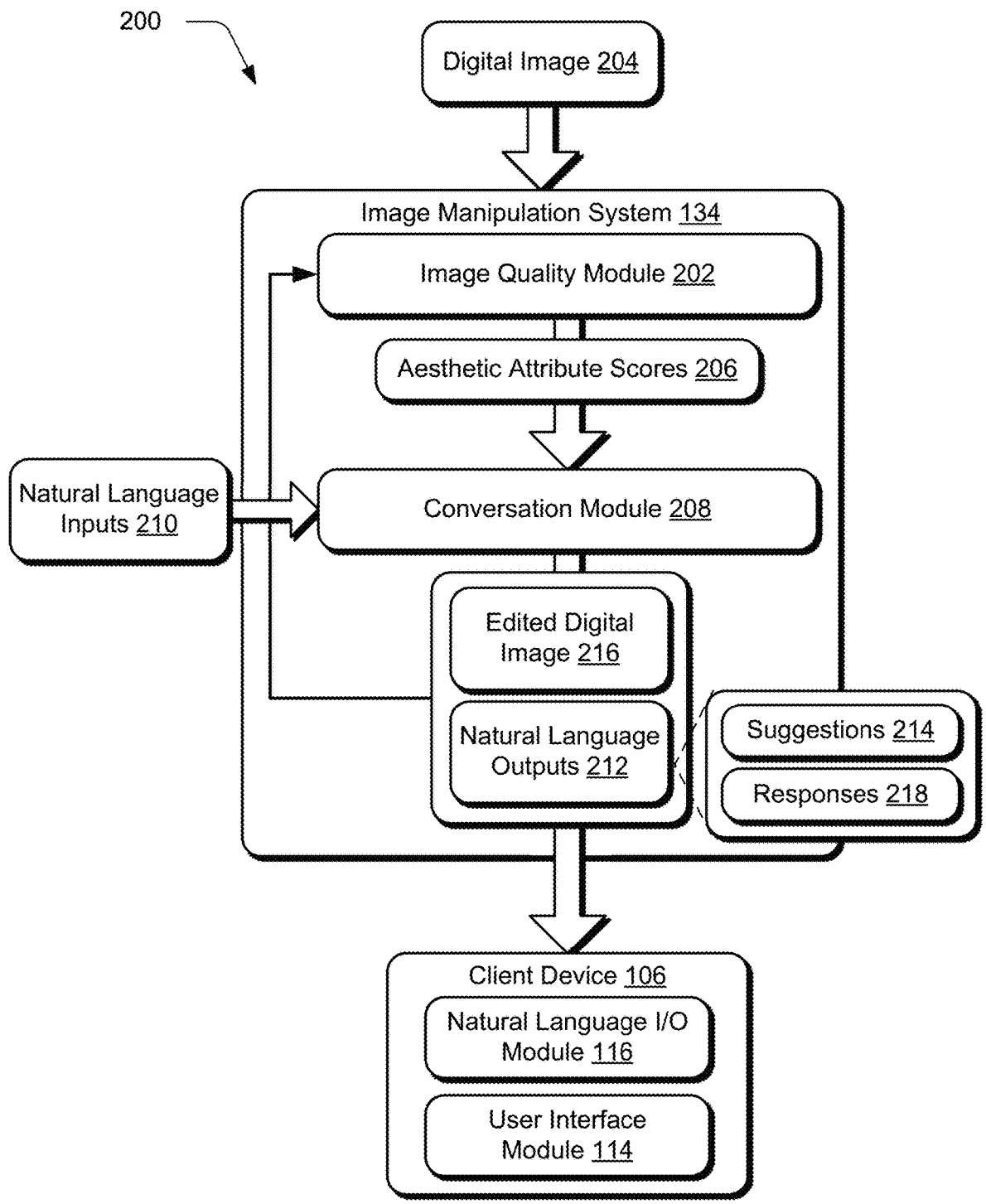
FIG. 2 depicts a system in an example implementation showing operation of the image manipulation system of FIG. 1 in greater detail.

Turning now to FIG. 2, a system 200 is depicted showing operation of the image manipulation system 134 of FIG. 1 in greater detail. In this example, the image manipulation system 134 includes an image quality module 202 that is configured to determine the quality of a digital image 204 by generating aesthetic attribute scores 206 for multiple aesthetic attributes of the digital image. The image quality module 202 may generate the aesthetic attribute scores 206 to span recognized photographic principals of color, lighting, focus, and composition and provide an overall quality attribute for each image analyzed. The overall quality attribute, for instance, may be generated by a linear combination of the aesthetic attribute scores 206. The image quality module 202 may use a variety of techniques to generate the aesthetic attribute scores 206, such as those used in Adobe® Content Analyzer Service (CAS) and described in the document "Photo Aesthetics Ranking Network with Attributes and Content Adaptation," by Shu Kong, Xiaohui, Zhe Lin, Radomir Mech, and Charles Fowlkes (ECCV 2016), which is incorporated by reference herein in its entirety. Examples of aesthetic attributes which may be used by the image quality module 202 to generate corresponding aesthetic attribute scores 206 are as follows:

TABLE 1

| | Aesthetic Attribute | Description |
|---|---|---|
| 1 | Balancing Element | whether the image contains balanced elements |
| 2 | Color Harmony | whether the overall color of the image is harmonious |
| 3 | Content | whether the image has good/interesting content |
| 4 | Depth of Field | whether the image has shallow depth of field |
| 5 | Lighting | whether the image has good/interesting lighting |
| 6 | Motion Blur | whether the image has motion blur |
| 7 | Object Emphasis | whether the image emphasizes foreground objects |
| 8 | Repetition | whether the image has repetitive patterns |
| 9 | Rule of Thirds | whether the photography follows rule of thirds |
| 10 | Symmetry | whether the photo has symmetric patterns |
| 11 | Vivid Color | whether the photo has vivid color, not necessarily harmonious color |
| 12 | Overall Quality | Created by a linear combination of the above attribute scores |

The aesthetic attribute scores 206 are output to a conversation module 208, which is configured to conduct a natural language conversation with a user to edit the digital image 204. The natural language conversation, for instance, includes natural language inputs 210 from a user which are used to refine the digital image 204 as the natural language conversation progresses. As described above, the natural language inputs 210 may be part of user interactions 110 received by the client device 106 via a user communication platform 104. The conversation module 208 may use a natural language utterance (NLU) processor to perform a mapping of possible input requests in the natural language inputs 210 to the most likely actionable intents. If a match is determined between a possible input request and an actionable intent, the conversation module 208 returns an intent (e.g., photobot.image.crop, photobot.image.search, etc.) which includes extracted entity objects (e.g., 16:9, "golden gate bridge", etc.). If the conversation module 208 is unable to determine a match between an input request and an actionable intent, an unfulfilled text response is returned for output to the user (e.g., "what aspect ratio should the image be cropped to?", "what image are you looking for?", etc.).

In other words, the conversation module 208 maps the natural language inputs 210 to an underlying canonical question or command specifying one, or multiple, of the aesthetic attributes associated with the digital image 204. The conversation module 208 then maps the underlying canonical question or command to a specific CAS query or command. The conversation module 208 may enumerate or learn utterances from the natural language inputs 210 for image editing operations, along with various image aesthetics attributes, such as those attributes listed in Table 1.

The conversation module 208 may also be configured to generate a natural language output 212, such as a suggestion 214 to edit the digital image based on at least one of the aesthetic attribute scores. For instance, the conversation module 208 may compare various aesthetic attribute scores 206 to threshold values for respective aesthetic attributes. The threshold values for the respective aesthetic attributes may be predetermined, or may be learned values based on preferences of the particular user, a type or category of digital image, or digital image editing trends of the particular user communication platform being used, to name a few examples. When the conversation module 208 detects a value below a threshold value for a particular aesthetic attribute, the conversation module conversationally indicates this attribute to a user to allow for manual correction or automatic correction by the image manipulation system 134. For example, if the aesthetic attribute score 206 for depth of field of the digital image 204 has a value of 0.509188 and the threshold value for the depth of field attribute is 0.750000, the conversation module 208 generates a suggestion 214 such as, "Do you want me to help you with the depth of field settings for your photo to make it look more professional?"

As the conversation to edit the digital image 204 progresses, the conversation module 208 outputs an edited digital image 216 as part of the conversation with the user. The edited digital image 216 may be output to the user interface module 114 of the client device 106 as described in relation to FIG. 1, such as via the image editing data 146. The edited digital image 216 may, in some cases, include multiple edited images with a range of respective corrections applied to the digital image 202, this providing the user with choices of corrections to apply to the digital image. Additionally or alternatively, the edited digital image 216 may be output as feedback to the image quality module 202, which may perform further analysis on the edited digital image 216 to generate additional aesthetic attribute scores 206.

The conversation module 208 also generates the natural language outputs 212 as part of the conversation with the user, which may include additional suggestions 214 to edit the digital image 204 or the edited digital image 216. The suggestions 214, for instance, may indicate options for additional edits to the digital image 204 and/or the edited digital image 216 based on the series of inputs and the edits to the digital image that have taken place thus far in the conversation with the user. In another example, the suggestions 214 may be based on a different aesthetic attribute score than the aesthetic attribute score used to generate the edited digital image 216. In this case, the suggestions 214 may indicate options for additional edits to the edited digital image 216 based on the natural language inputs 210 from the user and the executed edit to the digital image.

Additionally, the conversation module 208 generates responses 218 as part of the natural language outputs 212 used in the conversation with the user. The responses 218 provide conversational consistency with the user regarding the digital image 204 as the digital image is edited. For example, the responses 218 may provide a comment on the executed edit to the digital image 204, such as "Your photo looks much better now that the blur is removed!" In another example, the responses 218 may provide answers to questions included in the natural language inputs 210. For instance, based on a question provided in by a user in the natural language inputs 210, the conversation module 208 may provide responses 218 in the form of answers including information about quality of the digital image or indicating which of the multiple aesthetic attributes of the digital image that are able to be improved. The natural language outputs 212 are output to the natural language I/O module 116 of the client device 106, which in turn may be output by a speaker or by the user interface module 114 as described above.

Figure 3:
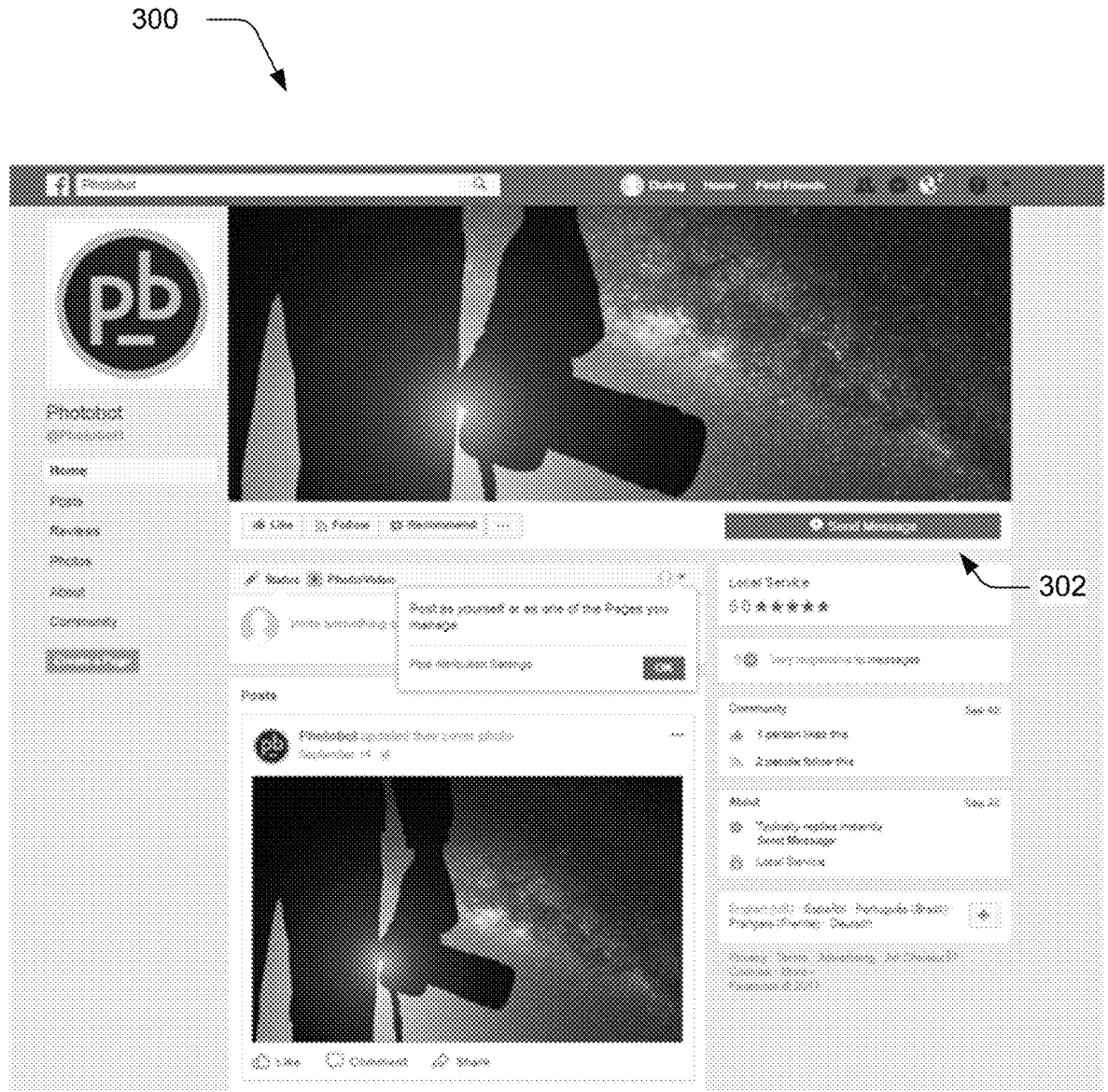
FIG. 3 depicts an example landing page of a communication platform configured to provide conversational image editing techniques as described herein.

FIG. 3 depicts an example landing page 300 of a communication platform (e.g., user communication platform 104) configured to provide conversational image editing techniques as described herein. The example landing page 300 depicts a Facebook® page of Adobe® Photobot to which a user may navigate using a Facebook® application or web site. The example landing page 300 includes a communication interface 302 (e.g., the communication interface 112) which in this case is Facebook® Messenger.

The user may initiate a conversation with the landing page 300, in this case the Adobe® Photobot page, through the communication interface 302 to edit a digital image. Once initiated, the image manipulation system 134 of FIG. 1 communicates with the user through the communication interface 302 of the landing page 300. The image manipulation system 134 applies both natural language interpretation and generation, and computer vision based analysis on digital images indicated for editing as part of the conversation. In doing so, the image manipulation system 134 enables users to perform these image editing tasks using a communication platform that many users are already comfortable with. While Facebook® Messenger is described as an example, any suitable communication platform may be used as described above and below.

Figure 4:
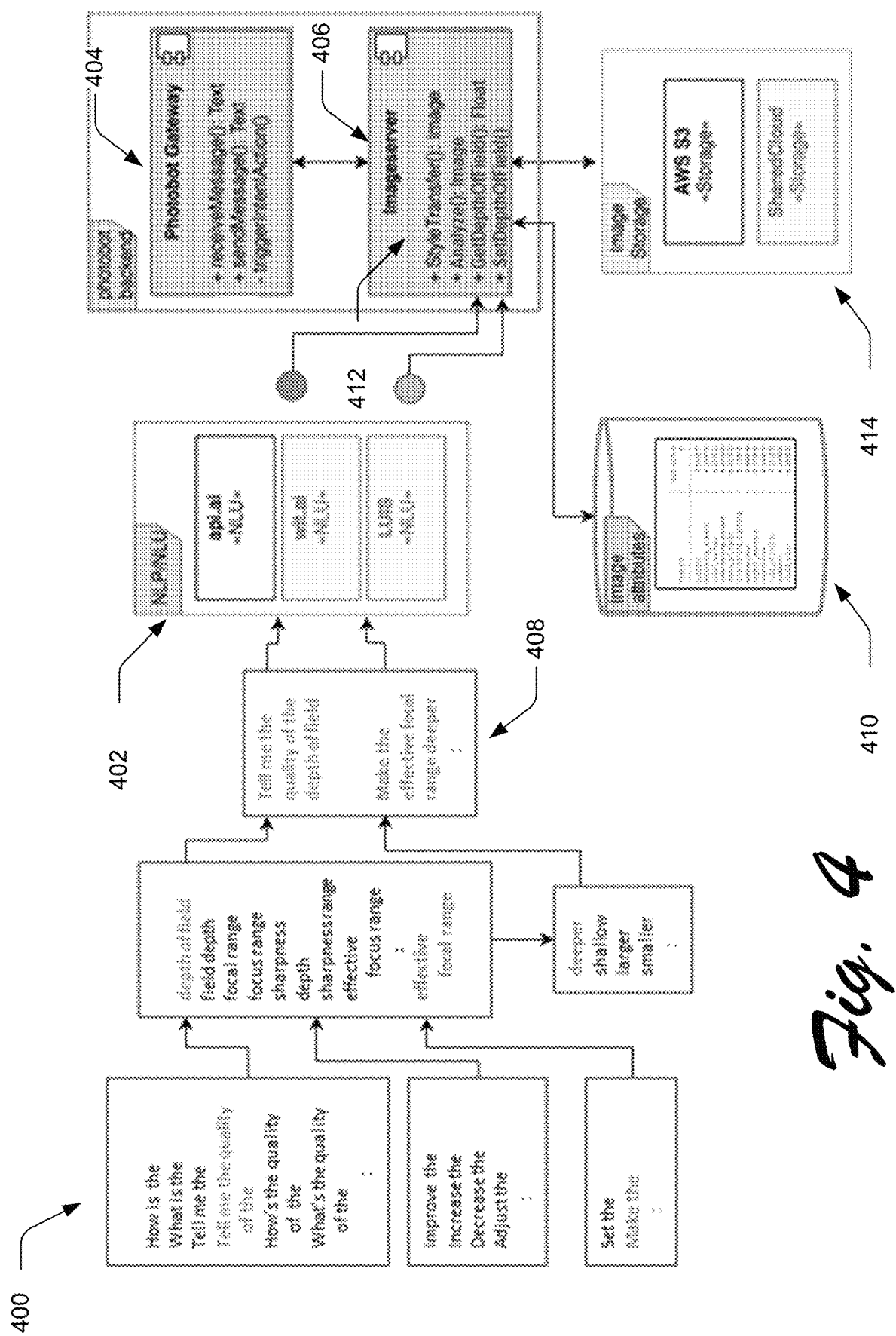
FIG. 4 depicts a system in an example implementation for image aesthetics processing in a conversational image editing environment.

Turning to FIG. 4, a system 400 is depicted in an example implementation for image aesthetics processing in a conversational image editing environment. Once a conversation is initiated, such as using the example landing page 300, a natural language processing engine 402 receives user inputs and maps the user inputs to underlying canonical image editing commands, referred to herein as "intentions." An individual intention can be invoked through natural language by issuing a text or speech utterance through a chatbot, messenger system, virtual agent, or other system configured to receive natural language inputs. Due to the diversity of natural language, there may be multiple possible utterances for expressing a desired intention, e.g., "make my picture brighter" and "please lighten this picture."

Once a user's intention is determined based on the natural language input, a photobot gateway 404 maps the intention to an image editing action that is executed by an image server 406. The photobot gateway 404 and the image server 406 continue to interact with the user in a conversational manner to edit the digital image based on the user's inputs and any previous actions taken to edit the digital image. To do so, the photobot gateway 404 and the image server 406 may rely upon a collection of utterances for different image editing intentions. The collection of utterances, and the image editing intentions to which the utterances correspond, may be learned and specified using an Image Editing Request (IER) natural language data collection and annotation system, such as described by Manuvinakurike et al. in "A data collection and annotation framework for learning to map between natural language commands and image editing actions" which is incorporated by reference herein in its entirety.

The photobot gateway 404 and the image server 406 collectively function to use the determined intentions to perform a variety of actions. For instance, the photobot gateway 404 and the image server 406 coordinate conversation interactions with a user to edit a digital image. The photobot gateway 404 and the image server 406 also manage the routing and storage of digital images that are being worked on, and provide search and retrieval functions to locate needed images for image editing operations that require an external image (e.g., style transfer). Additionally, the photobot gateway 404 and the image server 406 create and maintain essential conversation context including session state for a conversation. Further, the photobot gateway 404 and the image server 406 interact with other platforms, such as by managing requests to outside image services such as content analysis, and providing integration with different messenger, chatbot, and virtual agent platforms and services.

In a particular example depicted by the system 400, a question or command indicated by the user inputs may be expressed in any number of diverse ways. The user inputs are mapped to an underlying canonical question or command 408 which each respectively correspond to an aesthetic attribute 410. The aesthetic attributes 410 and other portions of the user inputs are then mapped to a specific CAS query or command 412. The aesthetic attributes 410 used by the natural language processing engine 402 in determining the underlying canonical question or command 408 span recognized photographic principals of color, lighting, focus, and composition, and provide a natural language vocabulary for use in digital image editing and image retrieval. Examples of aesthetic attributes 410 are shown in Table 1 above.

To generate the CAS query or command 412, the natural language processing engine 402 uses explicit input mapping rules, such as a keyword or phrase lattice, or as a set of utterances with annotated intents. The natural language processing engine 402 further applies aesthetic queries, image correction commands, and/or image enhancement commands. The natural language processing engine 402 determines, based on the query or command which resulted in the mapping and any corrections applied, a highest likelihood of intent for the user input 404. Then, the photobot gateway 404 uses the determined intent to identify an appropriate action to edit the digital image, or to retrieve a digital image such as from image storage 414. Example utterance to action mappings shown in the system 400 are "Tell me the quality of the depth of field" which results in an action Analyzer:GetDepthOfField( ) and "Make the effective focal range deeper" which results in action Analyzer:SetDepthOfField(Value). The photobot gateway 404 sends the actions to the image server 406 for execution.

Figure 5:
FIG. 5 depicts an example response to an aesthetics analysis request as part of the conversational image editing techniques described herein.

Additional functionality provided by the photobot gateway 404 and the image server 406 includes the incorporation of image aesthetic analysis to describe and conversationally guide the image editing operations. For instance, aesthetic attribute scores may be used to provide conversational interaction with a user for various aesthetic attributes of an image, such as color harmony, depth of field, and degree of interesting content. In FIG. 5, an example of a response 500 to an aesthetics analysis request as part of the conversational image editing techniques is depicted. The response 500 is a JSON response generated by the image server 406 to an aesthetic analysis request received from the photobot gateway 404, for example.

The response 500 may be generated responsive to receiving a digital image from a user to provide an initial aesthetic analysis of the digital image. Alternatively, the response 500 may be generated responsive to a specific request from a user to analyze particular aesthetic attributes of the digital image. When the image server 406 receives the request to aesthetically analyze a digital image, the image server generates various values corresponding to the different aesthetic features, and incorporates the values into the response 500. The particular response 500 has returned values for a subset of the aesthetic attributes, in this case, depth of field, motion blur, and object emphasis. The photobot gateway 404 may use this information to generate conversational responses to the user and suggest additional edits to the digital image. For example, if the image server 406 detects that the digital image is a portrait and the depth of field value included in the response 500 is below a threshold value for portrait-style photos, the photobot 404 may suggest increasing the depth of field of the digital image to improve the depth of field value returned in the response.

The digital image aesthetic attribute values included in the response 500 can be conveniently represented in tabular form for efficient searching, such as represented below:

TABLE 2

| Aesthetic Attribute | Score |
|---|---|
| Quality | 0.785943 |
| Depth of Field | 0.509188 |
| Motion Blur | −0.036149 |
| Object Emphasis | 0.335802 |

Image aesthetic value tables can be used by the photobot gateway 404 to answer questions about the quality of a digital image and/or to determine which aesthetics aspects can be improved. To determine an image aesthetic editing operations to carry out, the photobot gateway 404 can scan table rows of an image aesthetic value table and compare values to threshold values for the particular aesthetic attribute as described above. Additionally, image aesthetic value tables allow other question answering frameworks and services to answer questions and perform advanced image reasoning tasks.

An example of an output in a user interface of a conversational suggestion to edit a user's digital image is shown at 502, using the image aesthetic scores included in the response 500. The natural language processing engine 402, photobot gateway 404, and image server 406 use natural language interaction to talk about image aesthetic qualities, allowing users to more easily understand measures of image quality and then provide instructions to adjust the aesthetic elements in need of improvement. When a user uploads a digital image 504, the photobot gateway 404 generates a request to analyze the digital image to send to the image server 406, including determining aesthetic attribute values and scene estimation information using the request Analyze( ):Image.

The image server 406 recognizes the digital image 504 and provides an estimate of the scene, such as portrait or landscape. The image server 406 also computes aesthetic attribute scores for the digital image 504 and can generate an aesthetic attribute value table including the scores, along with ranking the different aesthetic attributes based on the scores. Using the values included in the aesthetic attribute value table, the photobot gateway 404 asks easy to understand, natural language questions (e.g., in the form of suggestions) which, if confirmed by the user, will alter the aesthetic attribute scores to improve the aesthetic attributes when the suggested edits are applied. For example, based on the depth of field score for the digital image 504, the photobot gateway 404 asks via the natural language processing engine 402 "Do you want me to help you with the depth of field settings for your photo to make it look more professional?"

If the user provides an affirmative response to the suggestion to edit the digital image 504 (e.g., "yes," "sure," "go ahead," etc.) the image server 406 applies the depth of field edit to the digital image. The photobot gateway 404 then sends another request to the image server 406 to analyze the edited image for further editing. For instance, a new ranking of the edited digital image could indicate that the color harmony of the digital image needs the most improvement, and the photobot gateway 404 can suggest an additional edit such as applying contrast stretching to the edited digital image. Alternatively or additionally, the new ranking of the edited digital image may indicate that the symmetry and rule of thirds aesthetic attribute scores need improvement, and the photobot gateway 404 can suggest cropping the digital image as an additional edit.

Figure 6A:
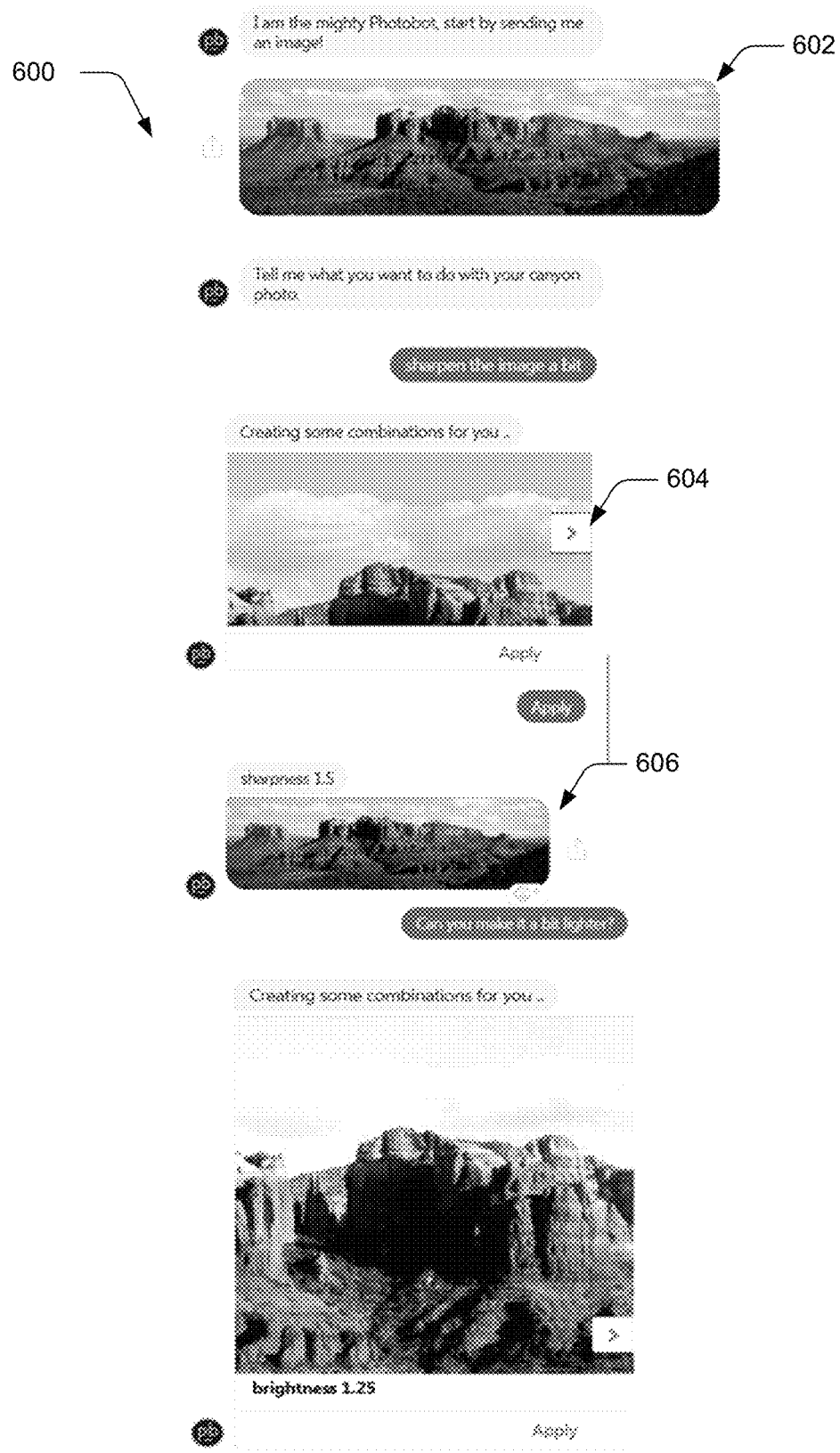
FIGS. 6A and 6B are an illustration of an example image editing natural language conversation with a user utilizing the techniques described herein.
Figure 6B:
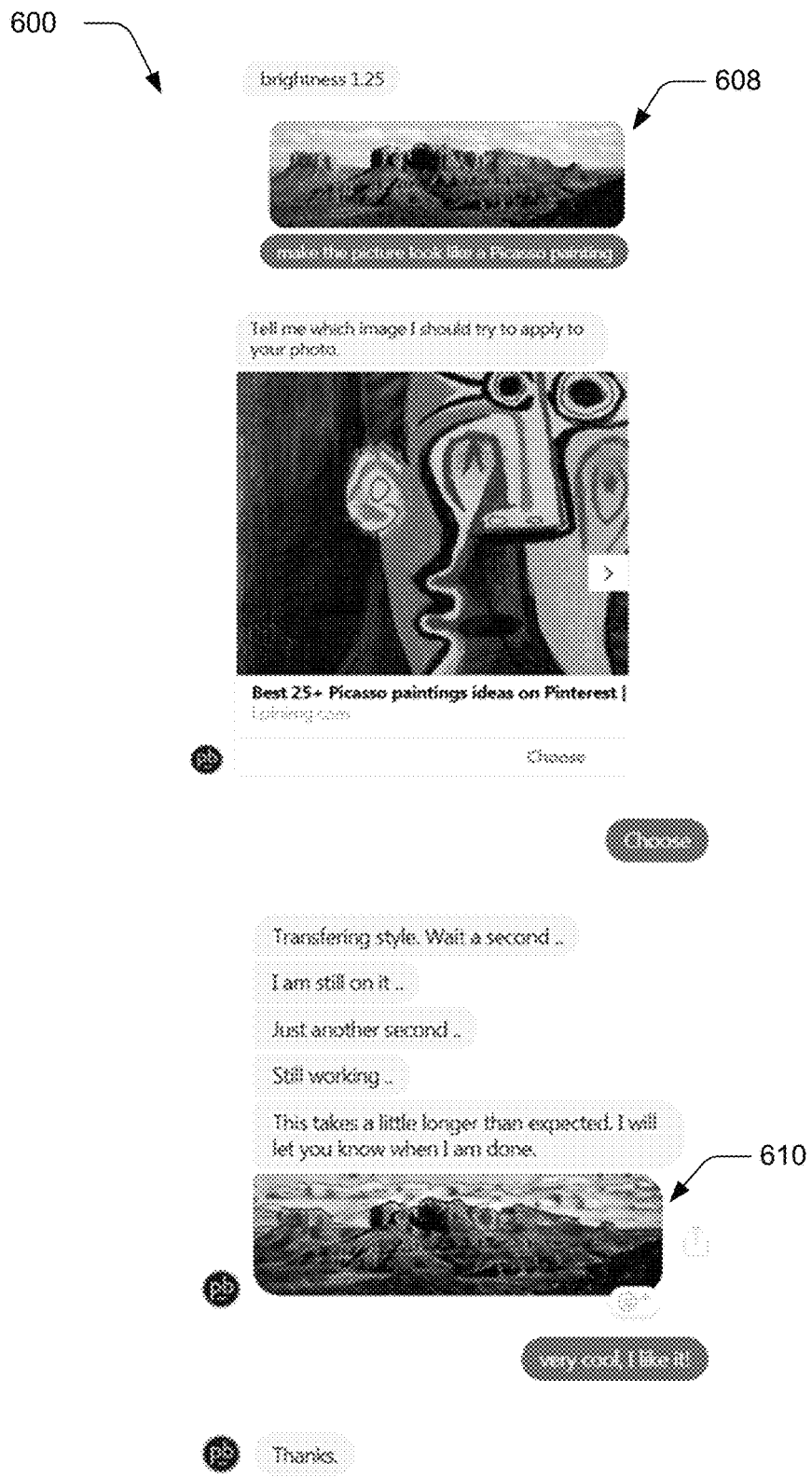

Turning to FIGS. 6A and 6B, an example image editing natural language conversation 600 with a user is depicted in accordance with the described techniques. The conversation 600 may be initiated using a landing page 300 as described in relation to FIG. 3, and may be coordinated by the image manipulation system 134 of FIG. 1. For example, a user may select the "Message" option on the landing page 300, which prompts the natural language output "I am the mighty Photobot, start by sending me an image!" to begin the conversation 600 in FIG. 6A. The user may select a digital image from a variety of sources, such as storage locations 120, 124, and/or 128 as described in relation to FIG. 1.

A digital image 602 selected by the user to edit as part of the conversation 600 is analyzed to identify objects or features within the digital image, and to generate aesthetic attribute scores for the image for use in suggestions of possible edits. The image manipulation system 134 identifies a canyon landscape as an object in the digital image 602, which causes the image manipulation system 134 to generate and display the natural language output, "Tell me what you want to do with your canyon photo." The user replies, "sharpen the image a bit." The image manipulation system 134 maps this input utterance to a most likely canonical intention, which in turn is mapped to an image editing action to apply to the digital image 602.

In this scenario, the image manipulation system 134 generates a set of sharpness edits applied to the digital image 602, from which, the user can select to cause the image manipulation system 134 to generate an edited digital image. Although not all of the sharpness edits are pictured, the user is able to switch between the individual ones of the sharpness edits using the arrow 604. The sharpness edits may be based on a range of edits from a minimum sharpness edit to a maximum sharpness edit, for example. The minimum and maximum edits may further correspond to the qualifier "a bit" stated by the user, which causes a smaller range of edits than if the user were to say "sharpen the image a lot." The number of edits included in the set of sharpness edits may be based on a step range for the edits, where the step range is a small reasonable number (e.g., three to five variations) based on the desired edit.

By generating the set of edits, the image manipulation system gives the user several options to choose from to edit the digital image 602, without overwhelming the user or requiring the user to search for a particular editing tool in a complicated user interface. Further, when the user selects one of the edits, the image manipulation system may use the selection to learn preferences of the user when the user uses inexact natural language terms, such as "a bit," which may be stored for use in future conversations. Once the user selects a preferred image edit, the image manipulation system 134 updates the image state for use in subsequent image editing operations as described above.

The image manipulation system 134 outputs the edited digital image 606 in accordance with the selection by the user from the set of sharpness edits. Then, the user asks, "Can you make it a bit lighter?" The image manipulation system 134 maps the natural language input by the user of "lighter" to an intention to brighten the edited digital image 606. The image manipulation system 134 then generates a set of brightness edits that the user may select from, similar to the described set of sharpness edits above. Moving to FIG. 6B, when the user selects one of the brightness edits, the image manipulation system 134 generates a second edited digital image 608 in accordance with the user's selection.

The user then provides another natural language input, "make the picture look like a Picasso painting." The image manipulation system 134 maps the natural language input to a style transfer intention from the phrase "make the picture look like . . . " The image manipulation system 134 may use digital images stored in storage 120 as examples from which the user may select a preferred style to transfer to the second edited digital image 608. Alternatively or additionally, the image manipulation system 134 may search for digital images according to the style suggested by the user via the user communication platform 104 to use as examples from which the user may select a preferred style. When the user selects one of the style transfer options, the image manipulation system 134 generates a third edited digital image 610 in accordance with the user's selection. The image manipulation system 134 can identify the user's intent to terminate the conversation from the natural language user input "very cool, I like it!" or suggest an additional edit to the third edited digital image as described above.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
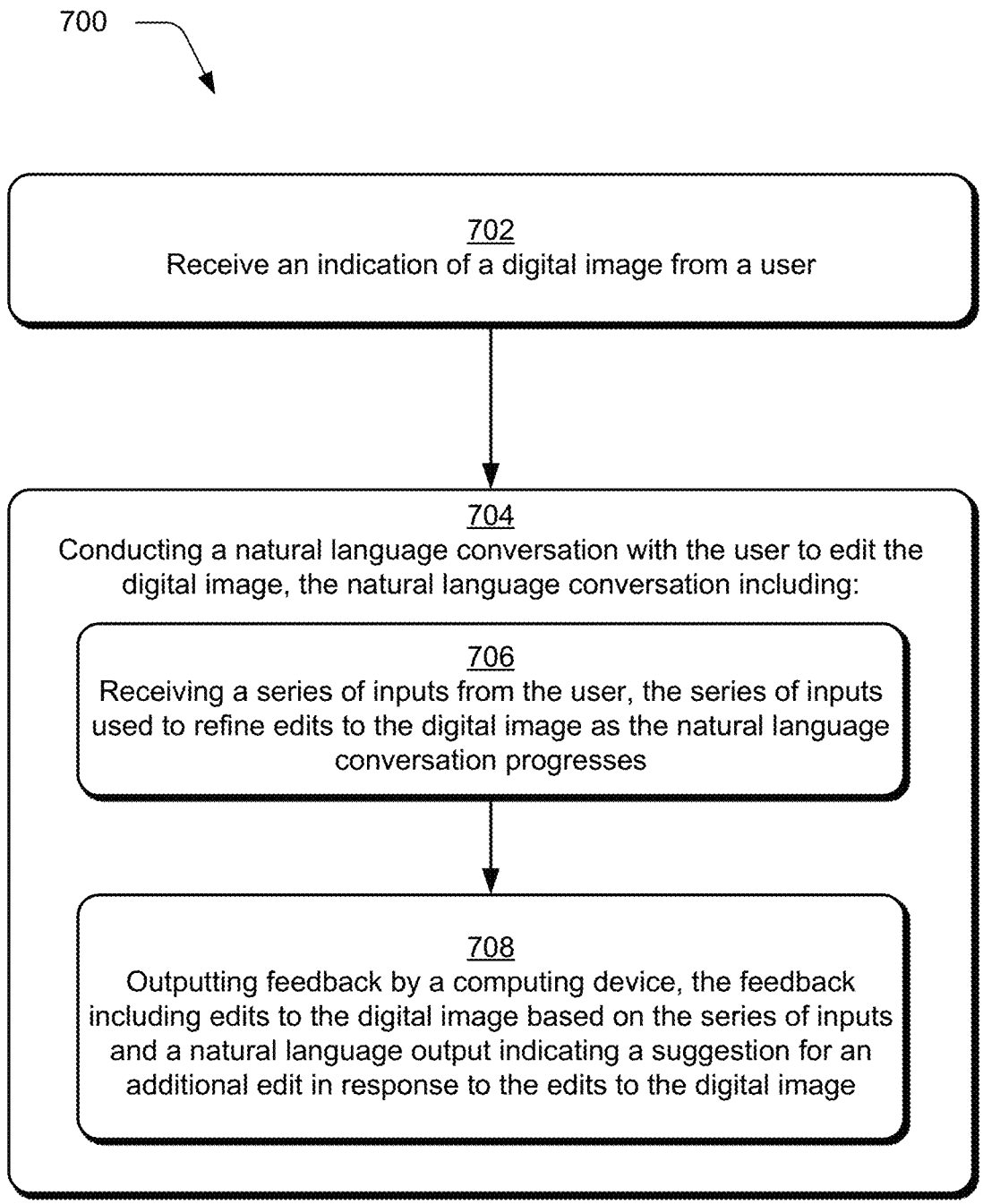
FIG. 7 is a flow diagram depicting a procedure in an example implementation in which a natural language conversation is conducted with a user to edit a digital image by a conversational image editing system.

FIG. 7 depicts a procedure 700 in an example implementation in which a natural language conversation is conducted with a user to edit a digital image by a conversational image editing system. First, an indication of a digital image is received from a user (block 702). The indication of the digital image may be, for instance, provided as a mouse input (e.g., drag-and-drop), text input (e.g., entering a file path), touch input, voice command, and so forth. The indication may be received using one of a variety of user communication platforms 104, such as a chatbot, social networking platform, communication platform, or virtual agent, to name a few examples. In some cases, the indication of the digital image may be in the form of a search, such as by the user stating by text or as a voice input, "find me a picture of the Seattle cityscape."

Then, a natural language conversation is conducted with the user to edit the digital image (block 704). The natural language conversation includes receiving a series of inputs from the user, which are used to refine edits to the digital image as the natural language conversation progresses (block 706). The natural language conversation also includes outputting feedback that includes edits to the digital image based on the inputs, and a natural language output indicating a suggestion for an additional edit in response to the edits to the digital image (block 708). The suggestion may be, for example, a text output by a chatbot, an auditory output by a speaker of the computing device, a user-selectable set of variations of an edit to the digital image, and so forth.

The natural language conversation enables the image manipulation system 134 to provide the user with functionality needed to perform image editing tasks for adjustment of basic properties of the digital image, including but not limited to brightness, contrast, hue, saturation, color tone, color balance, noise, and sharpness. The natural language conversation conducted using the image manipulation system 134 also functions to allow the user to specify, view, and apply effects such as style transfer to the indicated digital image. Further, the ability to use natural language alone, or in combination with computer vision implemented by the image manipulation system 134, gives users the ability to intuitively identify or localize specific areas of the digital image for editing purposes. In order to conduct the natural language conversation, the image manipulation system 134 uses natural language processing to map input utterances by the user to a most likely canonical intention. The image manipulation system 134 then maps the most likely canonical intention to an image editing action. The image manipulation system 134 can directly apply the image editing action to the digital image, or can display a set of edits, from which, the user may select a preferred edit to apply to the digital image. State information regarding the edits made to the digital image are stored by the image manipulation system 134, and used to further refine the digital image such as until the user indicates their satisfaction with the edits or otherwise terminates the conversation.

Figure 8:
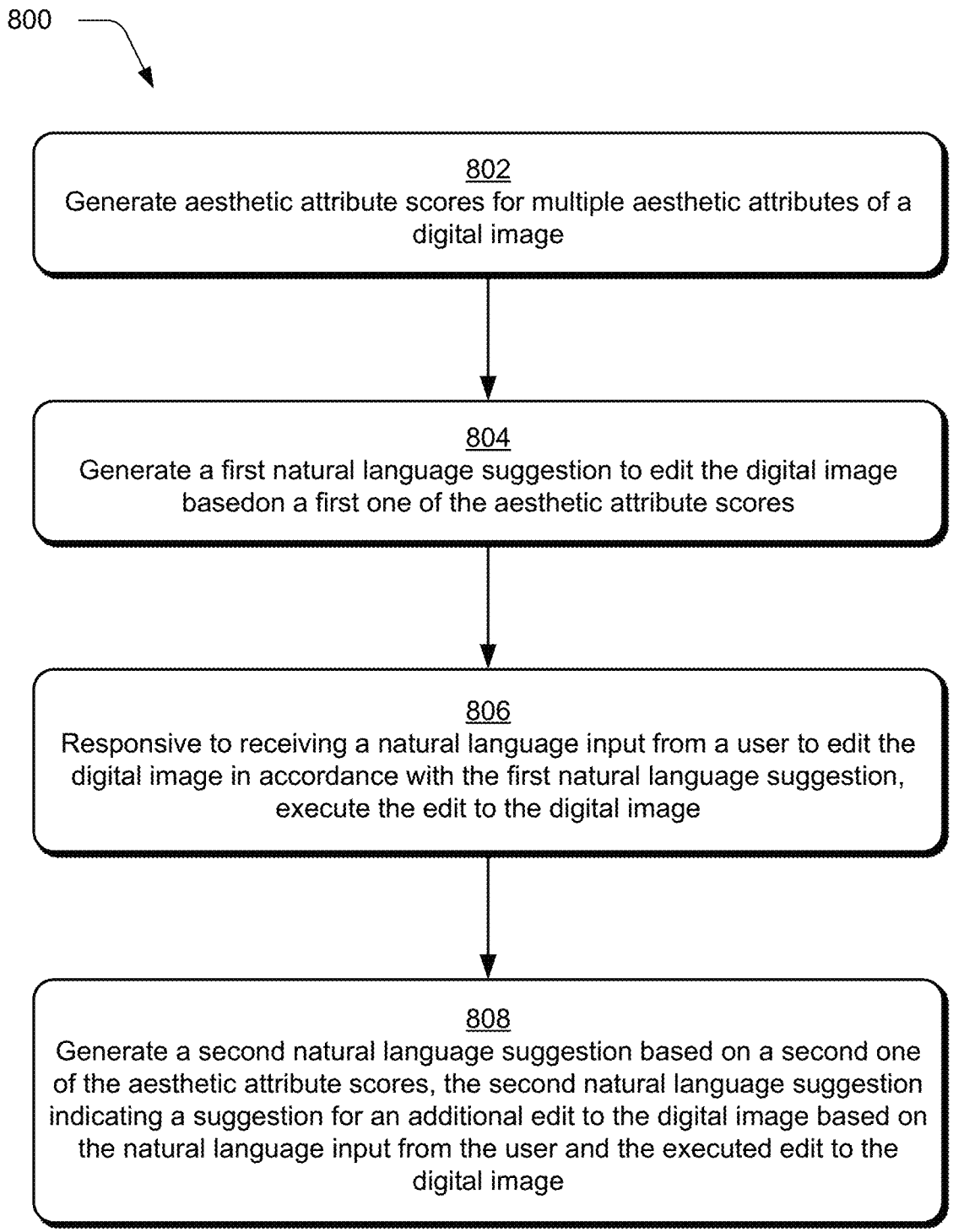
FIG. 8 is a flow diagram depicting a procedure in an example implementation in which an image is edited based on aesthetic attribute scores for the digital image and natural language input from a user by a conversational image editing system.

FIG. 8 depicts a procedure 800 in an example implementation in which an image is edited based on aesthetic attribute scores for the digital image and natural language input from a user by a conversational image editing system. First, aesthetic attribute scores are generated for multiple aesthetic attributes of a digital image (block 802). The image quality module 202, for instance, may generate the aesthetic attribute scores to span recognized photographic principals of color, lighting, focus, and composition and provide an overall quality attribute for each image analyzed. The image quality module 202 may use a variety of techniques to generate the aesthetic attribute scores 206, such as those used in Adobe® Content Analyzer Service (CAS). The aesthetic attribute scores may be represented in table form for efficient searching of different attributes by both the image manipulation system 134, and other digital image editing platforms which may be used to provide image editing functionality. Along with generating the aesthetic attribute scores, the image manipulation system 134 may use computer vision technology for automatic identification of general image scene categories (e.g., portrait or landscape) or objects within a scene and where such objects are located, for instance.

A first natural language suggestion is generated to edit the digital image based on a first one of the aesthetic attribute scores (block 804). For example, the image manipulation system 134 generates the first suggestion based on comparisons of the aesthetic attribute scores to threshold values for the respective aesthetic attributes. The image manipulation system 134 may rank the different aesthetic attributes based on a difference between the scores assigned to the digital image for each aesthetic attribute and the threshold values for the aesthetic attributes, then provide suggestions to edit the digital image based on the highest ranking aesthetic attribute or attributes. Digital image editing actions that will improve the respective aesthetic attribute scores are mapped to natural language outputs, providing easy to understand suggestions to the user to improve the quality of the digital image. As part of the first natural language suggestion, a set of edits may be presented to the user corresponding to a particular aesthetic attribute which each respectively alter the first aesthetic attribute score by a different amount to improve the corresponding aesthetic attribute.

The edit to the digital image is executed responsive to receiving a natural language input from a user to edit the digital image in accordance with the first natural language suggestion (block 806). The natural language input to edit the digital image may be a voice or text input affirming the edit to the digital image, or in some cases may be a selection (e.g., mouse click or touch input on a button labeled "Apply") to confirm the selection of the edit to the digital image. The natural language input to edit the digital image may be mapped to a canonical intention used to confirm the image editing operation to perform on the digital image.

A second natural language suggestion is generated based on a second one of the aesthetic attribute scores (block 808). The second natural language suggestion indicates a suggestion for an additional edit to the digital image based on the natural language input from the user, and the executed edit to the digital image. For example, the second natural language suggestion may be a result of a new set of aesthetic attribute scores being generated for the edited digital image, which may result in a different ranking of the aesthetic attribute scores based on the respective thresholds for the aesthetic attributes. The second natural language input from the user may provide a specific request to improve an aesthetic attribute of the digital image, may ask the image manipulation system how to make the digital image look a certain way, or may request a specific action such as applying a style transfer. In this way, the image manipulation system 134 uses the series of inputs from the user to refine the digital image while incorporating the state information of previous edits to persist through the conversation. This provides an intuitive experience for the user, who is no longer required to learn the sophisticated image editing interfaces of conventional systems.

Figure 9:
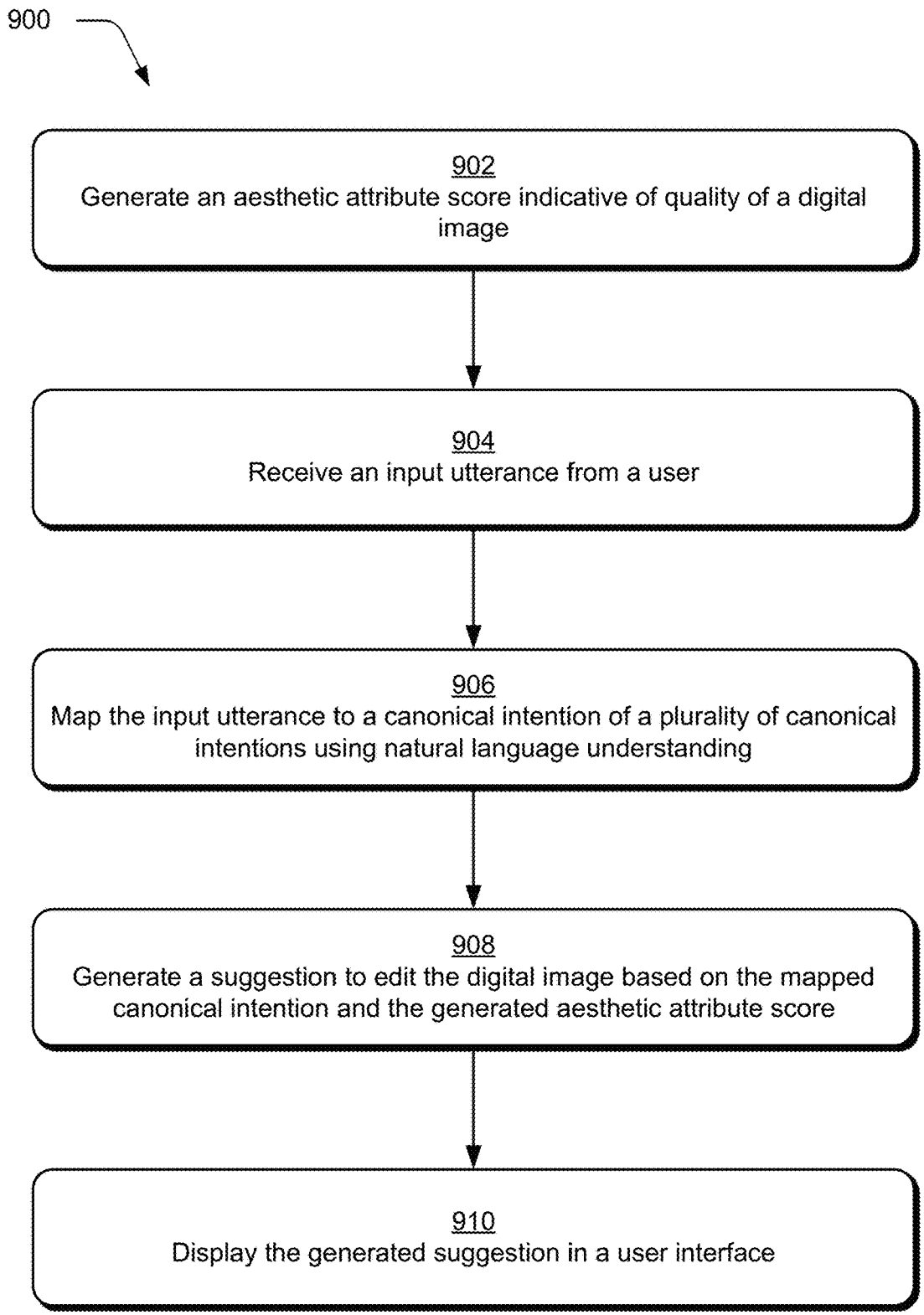
FIG. 9 is a flow diagram depicting a procedure in an example implementation in which an input utterance from a user is mapped to a canonical intention by a conversational image editing system and used with an aesthetic attribute score to generate a suggestion to edit a digital image.

FIG. 9 is a procedure 900 in an example implementation in which an input utterance from a user is mapped to a canonical intention by a conversational image editing system and used with an aesthetic attribute score to generate a suggestion to edit a digital image. First, an aesthetic attribute score is generated that indicates quality of the digital image (block 902). The image quality module 202 may rank the aesthetic attribute score with additional aesthetic attribute scores that provide further indications of quality of the digital image. The ranking may be determined by a difference between the aesthetic attribute scores and threshold values for different aesthetic attributes, as described above. Using the ranking of the aesthetic attribute scores, the conversation module 208 may refine the suggestion to edit the digital image based on the ranking, such as by prioritizing the aesthetic attribute that has the largest difference from a respective threshold for the aesthetic attribute to include in the suggestion.

An input utterance is received from a user (block 904). The input utterance is mapped to a canonical intention of a plurality of canonical intentions using natural language understanding (block 906). The canonical intention corresponds to a particular image editing operation to be accomplished by a variety of different commands. The conversation module 208 may map the input utterance to a subset of the plurality of canonical intentions, where the subset is based on the aesthetic attribute scores. In other words, the aesthetic attribute scores generated by the image quality module 202 may be used to "narrow down" the number of choices of canonical intentions, thus increasing computational efficiency in determining a likely intention of the user to edit the digital image.

In some cases, the conversation module 208 maps the canonical intention to the particular image editing operation, and edits the digital image according to the particular image editing operation. Further, the conversation module 208 may generate a set of edits for output in a user interface of the client device 106 in accordance with the particular image editing operation, such as the step range of edits of a particular (or multiple) aesthetic attributes. Then, the edit executed by the conversation module 208 to the digital image may be based on a user selection of one (or more) of the set of edits.

Then, a natural language suggestion to edit the digital image is generated based on the mapped canonical intention and the generated aesthetic attribute score (block 908). The natural language suggestion to edit the digital image may be refined in a variety of ways. For example, the image quality module 202 may identify an image scene category, such as a landscape, a selfie, a particular object, and so forth. The image scene category can be identified using computer vision, as described above. The conversation module 208 may refine the suggestion to edit the digital image based on the identified image scene category, such as by adjusting threshold values for different aesthetic attributes used to generate the suggestion based on the identified image scene.

The generated suggestion is output in a user interface (block 910). Based on the suggestion and subsequent to displaying the suggestion, the conversation module 208 may perform an edit in accordance with the suggestion to the digital image, e.g., in response to confirmation from the user to perform the edit in accordance with the suggestion. Once the edit is performed on the digital image, the edited digital image 216 may be returned to the image quality module 202 to refine the aesthetic attribute scores based on the edits, or the conversation module may use the original aesthetic attribute scores to continue editing the digital image.

The natural language I/O module 116, for instance, may receive additional inputs from the user (e.g., natural language inputs 210) to continue editing the digital image as the natural language conversation progresses. For example, the natural language I/O module may receive an additional input utterance from the user that includes an indication to adjust an image attribute. After the conversation module 208 maps the additional input utterance to a canonical intention as described above, the image manipulation system 134 edits the digital image based on the additional input utterance, and an aesthetic attribute score corresponding to the image attribute. In this way, the image manipulation system 134 dynamically continues the image editing process using natural language inputs from the user, without the user having to learn a complex image editing software interface or functionality.

Example System and Device

Figure 10:
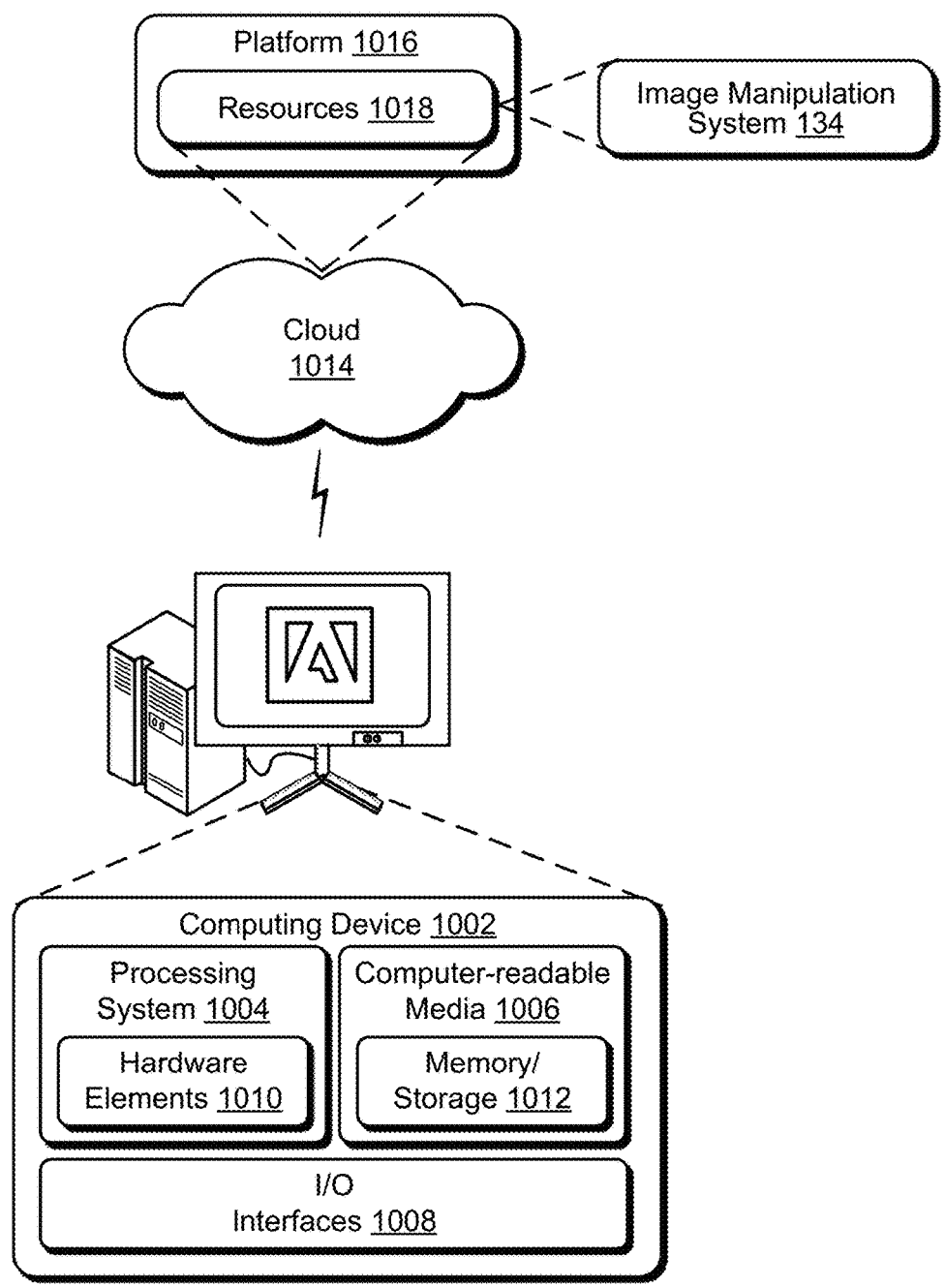
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the image manipulation system 134. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital media interactive communication environment, a method implemented by at least one computing device, the method comprising:

generating, by the at least one computing device, an aesthetic attribute score indicative of quality of a digital image;

determining, by the at least one computing device, a subset of a plurality of canonical intentions based at least in part on the aesthetic attribute score;

receiving, by the at least one computing device, an input utterance from a user;

mapping, by the at least one computing device, the input utterance to a canonical intention from the subset of canonical intentions using natural language understanding;

generating, by the at least one computing device, a suggestion to edit the digital image based on the mapped canonical intention; and displaying, by the at least one computing device, the generated suggestion in a user interface.

2. The method of claim 1, further comprising:

receiving, by the at least one computing device, an additional input utterance including an indication to adjust an image attribute; and editing, by the at least one computing device, the digital image based on the additional input utterance and an aesthetic attribute score corresponding to the image attribute.

3. The method of claim 1, further comprising:

identifying, by the at least one computing device, an image scene category of the digital image using computer vision; and refining, by the at least one computing device, the suggestion to edit to the digital image based on the identified image scene category.

4. The method of claim 1, further comprising:

ranking, by the at least one computing device, the aesthetic attribute score with additional aesthetic attribute scores indicative of the quality of the digital image;

refining, by the at least one computing device, the suggestion to edit the digital image based on the ranking of the aesthetic attribute score.

5. The method of claim 1, wherein the canonical intention corresponds to a particular image editing operation to be accomplished by a variety of different commands, and the method further comprises editing the digital image according to the particular image editing operation.

6. The method of claim 5, further comprising displaying a set of edits based on the particular image editing operation, wherein the editing the digital image is based on receiving a user selection of an edit of the set of displayed edits.

7. The method of claim 1, further comprising:

executing, by the at least one computing device, an image editing operation based on the suggestion and subsequent to the displaying the suggestion; and refining the aesthetic attribute score of the digital image based on the executed image editing operation.

8. In a digital media interactive communication environment, a conversational digital image editing system, the system comprising:

an image quality module implemented at least partially in hardware of at least one computing device configured to identify an image scene category using computer vision and generate multiple aesthetic attribute scores for multiple aesthetic attributes of a digital image, respectively; and a conversation module implemented at least partially in hardware of the at least one computing device to:

generate a first natural language suggestion to edit the digital image based on a first one of the aesthetic attribute scores and the image scene category;

responsive to receiving a natural language input from a user to edit the digital image in accordance with the first natural language suggestion, execute the edit to the digital image; and generate a second natural language suggestion based on a second one of the aesthetic attribute scores and the image scene category, the second natural language suggestion indicating a suggestion for an additional edit to the digital image based on the natural language input from the user and the executed edit to the digital image.

9. The conversational image editing system of claim 8, wherein the image quality module is further configured to generate an overall quality score for the digital image by calculating a linear combination of the aesthetic attribute scores; and the conversation module is further configured to generate a natural language output based on the overall quality score for the digital image, wherein the natural language output is included as part of the first natural language suggestion or the second natural language suggestion.

10. The conversational image editing system of claim 8, wherein the image quality module is further configured to compare the aesthetic attribute scores to threshold values for the respective aesthetic attributes to determine which of the aesthetic attribute scores to use in generating the first natural language suggestion.

11. The conversational image editing system of claim 10, wherein the image quality module is further configured to rank the aesthetic attribute scores based on a difference between the aesthetic attribute scores and the respective threshold values to refine which of the aesthetic attribute scores to use in generating the first natural language suggestion.

12. The conversational image editing system of claim 8, wherein the conversation module is further configured to generate a set of edits to one of the aesthetic attributes based on the aesthetic attribute scores that are user selectable to select an edit to the digital image.

13. The conversational image editing system of claim 12, wherein the set of edits include a step range for the edits based on the one of the aesthetic attributes.

14. The conversational image editing system of claim 8, wherein the conversation module is further configured to generate a natural language response to the user based on the natural language input from the user and the executed edit to the digital image, the natural language response including a comment on the executed edit to the digital image.

15. The conversational image editing system of claim 8, wherein the conversation module is further configured to:

receive a natural language question from the user regarding the digital image; and generate a natural language response to the natural language question, the natural language response including information about quality of the digital image or indicating which of the multiple aesthetic attributes of the digital image are able to be improved.

16. In a digital media interactive communication environment, a conversational digital image editing system, the system comprising:

means for receiving an indication of a digital image from a user;

means for generating aesthetic attribute scores for multiple aesthetic attributes of the digital image;

means for conducting a natural language conversation with the user to edit the digital image, the natural language conversation including:

receiving an input utterances;

mapping the input utterance to a respective canonical intentions of a plurality of canonical intentions using natural language understanding, the respective canonical intention corresponding to an image editing operation; and localizing the image editing operation to a portion of the digital image using computer vision; and means for outputting the digital image including the digital image as edited by the image editing operation in a user interface.

17. The conversational image editing system of claim 16, wherein the means for generating the aesthetic attribute scores is further configured to generate additional aesthetic attribute scores for the multiple aesthetic attributes based on refined edits to the digital image.

18. The conversational image editing system of claim 16, further comprising means for comparing the aesthetic attribute scores to threshold values for the respective aesthetic attributes; and the means for conducting the natural language conversation is further configured to generate a suggestion of the image editing operation based on the aesthetic attribute scores that are below the threshold values for the respective aesthetic attributes.

19. The conversational image editing system of claim 18, further comprising means for learning the threshold values based on:

preferences of the user;

a category of digital image to which the digital image belongs; or digital image editing trends.

20. The conversational image editing system of claim 16, further comprising means for determining a subset of a plurality of canonical intentions based at least in part on the aesthetic attribute scores and wherein the mapping is based on the subset.

* * * * *

UNITED STATES PATENT AND TRADEMARK OFFICE
CERTIFICATE OF CORRECTION

PATENT NO. : 10,796,690 B2
APPLICATION NO. : 16/109464
DATED : October 6, 2020
INVENTOR(S) : Ganz et al.

It is certified that error appears in the above-identified patent and that said Letters Patent is hereby corrected as shown below:

In the Claims

Column 24, Line 17, after "receiving an input", delete "utterances", insert -- utterance --, therefor.

Column 24, Line 19, delete "intentions", before "of a plurality" insert -- intention --, therefor.

Signed and Sealed this
Twenty-second Day of December, 2020

Andrei Iancu
*Director of the United States Patent and Trademark Office*